Patented Mar. 10, 1931

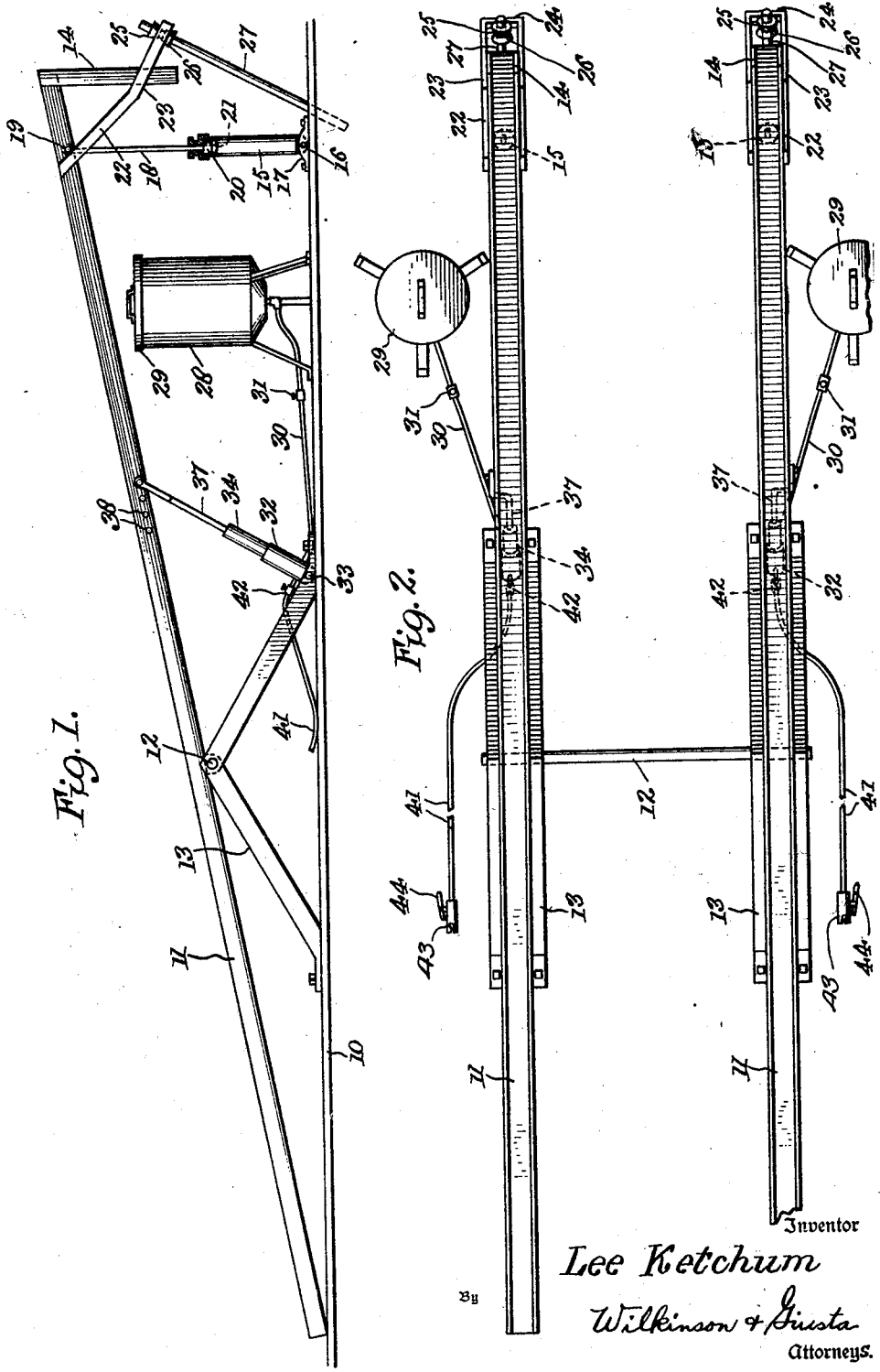

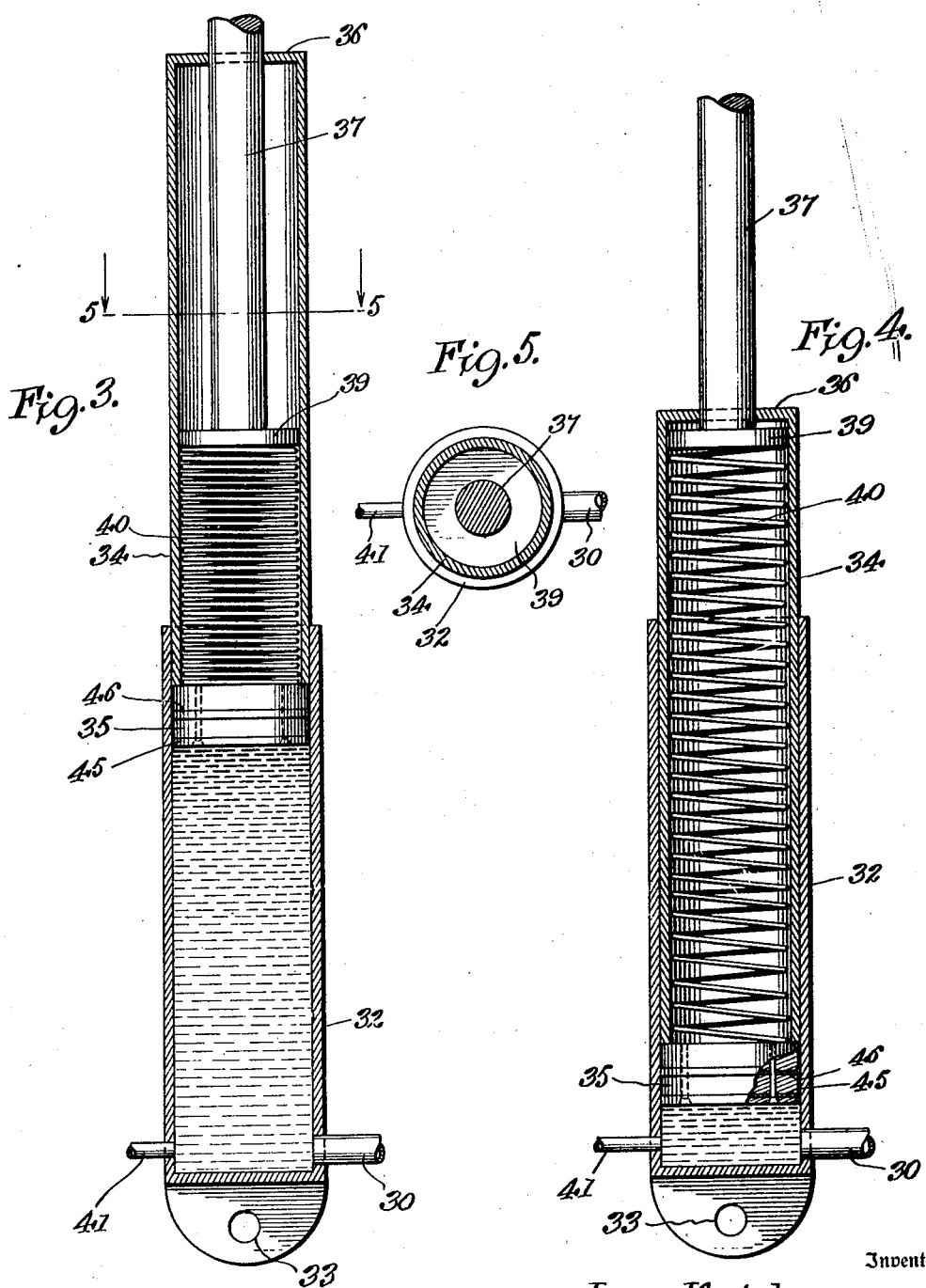

1,795,955

UNITED STATES PATENT OFFICE

LEE KETCHUM, OF MEMPHIS, TENNESSEE, ASSIGNOR OF ONE-HALF TO JOHN S. HURD, OF MEMPHIS, TENNESSEE

VEHICLE LUBRICATING DEVICE

Application filed September 9, 1929. Serial No. 391,395.

The present invention relates to improvements in vehicle lubricating devices, and it more particularly refers to a device useful in connection with fuel service stations for automobiles, in which the act of driving the vehicle upon the device will put the lubricant under pressure and in condition to penetrate the bearings and other parts to be lubricated.

Another object of the invention resides in providing an improved vehicle lubricating device in which a saving in time both for the motorist and for the service station attendant is had, and in which facility is promoted in the lubrication of vehicles.

A further object of the invention lies in providing an improved lubricating device in which the lubrication of vehicles is accomplished faithfully, and in which an appropriate charge of lubricant is assured to each part.

With the foregoing and other objects in view, the invention will be described more fully hereinafter and will be more particularly pointed out in the appended claims.

In the drawings, in which like symbols refer to like or corresponding parts throughout the several views, Figure 1 is a side elevation of an improved vehicle lubricating device constructed according to the present invention, Figure 2 is a top plan view of the same with parts broken away, Figure 3 is a central vertical section taken on an enlarged scale through the improved pump employed and showing the parts in one position, Figure 4 is a similar view with the parts shown in subsequent position for expelling the lubricant, and Figure 5 is a transverse section taken on the line 5—5 in Figure 3, and looking in the direction of the arrows.

Referring more particularly to the drawings, 10 designates the ground line or floor of a garage service station or the like, and 11 designates a tilting platform for the vehicle, which may conveniently be constructed of a pair of spaced channel irons adapted to receive the wheels of the automobile, car, locomotive, or other vehicle. The platform 11 is fulcrumed, as indicated at 12, to inverted V-shaped or other supporting frames 13.

At the remote ends of the channel irons 11 are mounted depending stops 14 adapted to engage the ground when this end of the platform is depressed by the weight of the vehicle, as later explained. Adjacent the stops 14, dash pots 15 are coupled to the platform irons whereby to cushion the descent of this remote end of the platform. The cylinders of the dash pots are pivoted, as indicated at 16, to fittings 17 secured to the ground or floor 10. The plunger rods 18 of the dash pots are pivoted, as indicated at 19, to the channel irons 11. The dash pots, being pivoted at opposite ends at the points 16 and 19, are self-aligning. The plungers 20, which are coupled to the rods 18 and reciprocate in the dash pots 15, are traversed by restricted apertures or by-passes 21 which permit a slow transfer of the fluid in the dash pots from one side of the pistons 20 to the opposite sides thereof.

As a further cushioning means, the channel irons 11 may be provided with arms 22 which extend rearwardly and downwardly, and are provided with the angular end portions 23 carrying slidable heads 24, in each of which a pair of friction cones 25 and 26 are so mounted as to rotate upon rods 27, which are anchored in the floor and preferably extend up at the inclination shown in Figure 1. This friction device will also act to eliminate any side play in the platform or channel irons 11.

One or more lubricant chambers or reservoirs are shown at 28, they being mounted at appropriate points, and such chambers may be replenished from time to time with lubricant by lifting the removable covers 29 thereof. The lower portions of the chambers 28 are coupled to lubricant conduits 30 having check valves 31 therein, which will permit outflow of the lubricant from the chambers, but will resist the return of the lubricant through the pipes 30. The pipes 30 extend to the lower portions of pump cylinders 32, which are pivoted at 33 to the frames 13 or other appropriate parts. Slidably mounted in the pump cylinders 32 are hollow pump barrels 34 having pump pistons 35 secured at the inner ends thereof and having perforated outer ends 36 for slidably receiving therethrough the plunger rods 37. These plunger rods are pivotally connected to the channel irons 11, preferably at any of a number of selected points 38, whereby the capacity of the pump may be regulated.

The plunger rods 37 are provided with plungers 39 fitted to reciprocate within the hollow barrels 34, and movable independently of the barrels. Coil springs 40 are held in the hollow barrels 34 and abut at one end against the plungers 39, and at the other end against the pump pistons 35. The pistons 35 may be originally made separately from the barrels 34, and subsequent to the introduction of the coil spring 40, such pistons 35 may be coupled to the barrels 34 in any appropriate manner, such as by bolting, riveting, welding, and the like.

Outlet conduits or hose sections 41 connect with the lower portions of the cylinders 32 and contain check valves 42 which will permit of the out-flow of the lubricant from the pumps, but will avoid any back pressure through the hose lines toward said pumps. Each hose line 41 may be provided with any appropriate type of nozzle 43 suitable for applying lubricant to the shackle bolts, steering spindles and other parts of automobiles, locomotives and other vehicles. Each nozzle 43 is preferably provided with a valve 44 which is normally closed.

In the use of the device, the parts will be in the position shown in Figure 1, with the platform in the inclined position ready to receive a vehicle thereon. The driver of the vehicle desiring working service will drive into the garage or service station, and up the run-way of channel irons 11. As the vehicle passes the fulcrum or center 12, the weight thereof will cause the remote portion of the platform to descend.

The rapid descent of this portion of the platform under the great weight of a vehicle will be checked by the dash pots and by the friction cone devices, which latter will also avoid any lateral play of the apparatus. The stops 14 will determine the final position of the parts, and these stops 14 may be arranged so that the remote end of the platform will not descend too far below a horizontal position, such as would tend to cause movement of the vehicle by gravity off the platform. The throw of the platform may be determined by the length of the stops 14. The stops 14 may be so arranged that when the platform arrives at the horizontal plane of the fulcrum 12 that such stops will engage the ground line 10 and arrest the further descent of the platform, thus holding the vehicle at a true horizontal position during the performance of the greasing and lubricating operations.

Now as this end of the platform descends under the weight of the vehicle, the plunger rods 37 will be moved down with the platform. In so moving, the plungers 39 carried by the rod descends within the hollow barrel 34, as indicated in Figure 3, compressing before it the coil spring 40. It is assumed in Figure 3 that the pump cylinder 32 is filled with lubricant, which lubricant cannot escape back to the reservoir or chamber 28 by reason of the check valve 31, and cannot escape in the opposite direction by reason of the normally closed position of the valve 44 in the nozzle 43.

The compacted lubricant body in the pump cylinder 32 will avoid any movement of the barrel 34, or its connected pump piston 35, but the coil spring 40 will be compressed by the downward movement of the plunger 39, whereby this coil spring 40 will be put in a potential position to drive down the piston 35 and barrel 34 whenever the valve 44 is opened. In other words, when the pressure is relieved in the hose 41, the coil spring 40 may expand and drive the barrel and piston 35 downwardly in the cylinder 32, thus expelling lubricant out through the hose 41 and nozzle 43 and into the bearing to which this nozzle is connected. The operator will, of course, only momentarily open the valve 44 to allow a desired quantity of the lubricant to be introduced to the barrel. When he releases the valve 44, the same will automatically close, in accordance with a well-understood valve action, and the further descent of the piston 35 will be promptly checked. In this way, the piston 35 may be allowed to descend step by step at each new application of the plunger 43 to the various bearings or other parts to be lubricated, and the pump will ordinarily hold sufficient lubricant for greasing the entire vehicle.

After the lubrication has been performed, the vehicle is backed down the platform 11, and as soon as it passes the center point 12, the weight of the vehicle will act to restore the parts to the position shown in Figure 1, elevating the remote end of the platform slowly, due to the dash pots and the friction cones, and lifting the plunger rod 37 and the attached plunger 39, which will engage the barrel 34 and raise the barrel and the pump piston 35 to the upper initial position.

In so doing, the suction created by the lifting of the plunger 35 will act to draw in lubricant through the conduit 30 from the lubricant chamber 28. The pump piston 35 is preferably constructed with leather or other washers or cups 45 and 46, which are spaced apart and crimped in opposite directions, whereby the lower washers 45 may expand against the walls of the cylinders 32 on the down strokes of the pistons and avoid leakage of the lubricant about such pistons; whereas on the up stroke of the pistons 35, the upper washers 46 will expand and act in a like capacity.

It will, of course, be understood that one or more pumps may be used in connection with the device, two such pumps being shown in the drawings. Where a plurality of pumps are employed, the same may be connected to separate lubricant chambers containing lubricants of varying weights. For instance, where oil was used, one chamber might contain light, another medium, and the third of heavy oil. A still further chamber might contain grease for the differential and transmission of the vehicle.

It will be obvious that many changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. An improved vehicle lubricating device comprising a movable platform adapted to receive a vehicle and be moved by the weight thereof, means for checking the rapid descent of the platform, a source of lubricant supply, pump means connected to the source of lubricant supply and to the platform and acting to withdraw a quantity of lubricant from such supply, and place the same under pressure, and delivery means extending from said pump means and adapted to be coupled to the parts of the vehicle to be lubricated.

2. An improved vehicle lubricating device comprising a tilting platform adapted to receive a vehicle and to be shifted by the weight of the vehicle, means for arresting the rapid descent of the platform, stop means carried by said platform, a pump coupled to said platform and in communication with a source of lubricant supply for automatically placing the lubricant under pressure upon the descent of the platform, and lubricant delivery means connected to said pump for application of the lubricant to the vehicle parts.

3. An improved vehicle lubricating device comprising a pivoted platform for the vehicle, a pump in communication with a source of lubricant supply coupled to said platform and moved thereby for withdrawing charges of lubricant from the source and delivering same to the parts of the vehicle to be lubricated, and means for regulating the delivery of the lubricant to the vehicle.

4. An improved vehicle lubricating device comprising a shiftable platform for the vehicle, a pump coupled for automatic action to the platform and including a cylinder in communication with a source of lubricant supply, a piston movably mounted in said cylinder, a coil spring associated with said piston, means initially moved by the descent of the platform for placing said coil spring under pressure, and a normally closed delivery conduit leading from said cylinder.

5. An improved vehicle lubricating device comprising a movable platform for the vehicle, a pump operatively connected with said platform and including a cylinder in communication with a source of lubricant supply, a piston mounted to reciprocate in said cylinder, a hollow barrel connected to move with said piston, a coil spring disposed in said barrel, a plunger movably mounted in said barrel for compressing said spring, a plunger rod coupled to said plunger and to the platform, and normally closed delivery means for the lubricant connected to said cylinder.

LEE KETCHUM.